US008829738B2

(12) United States Patent
Ho

(10) Patent No.: US 8,829,738 B2
(45) Date of Patent: Sep. 9, 2014

(54) CONNECTING APPARATUS WITH A COMBO PORT

(75) Inventor: Ming-Hsi Ho, Miaoli County (TW)

(73) Assignee: Arcadyan Technology Corporation, Hsinchu (TW)

( * ) Notice: Subject to any disclaimer, the term of this patent is extended or adjusted under 35 U.S.C. 154(b) by 537 days.

(21) Appl. No.: 13/210,633

(22) Filed: Aug. 16, 2011

(65) Prior Publication Data

US 2012/0056491 A1 Mar. 8, 2012

Related U.S. Application Data

(60) Provisional application No. 61/380,805, filed on Sep. 8, 2010.

(51) Int. Cl.
*H01H 3/00* (2006.01)

(52) U.S. Cl.
USPC .......................................... 307/139

(58) Field of Classification Search
USPC ......................................................... 307/139
See application file for complete search history.

(56) References Cited

U.S. PATENT DOCUMENTS

2012/0057694 A1* 3/2012 Lee et al. ...................... 379/423

* cited by examiner

*Primary Examiner* — Robert L. Deberadinis
(74) *Attorney, Agent, or Firm* — Rosenberg, Klein & Lee

(57) ABSTRACT

Provided is a connecting apparatus with a combo port. The connecting apparatus particularly supports two or more connecting terminals in compliance with various types, especially the RJ-45 and RJ-11 connectors. According to one of the embodiments, the apparatus with combo port includes a detecting circuit and a connector control unit. The apparatus is preferably functioned to detect the electrical signals from a connecting source, and perform an automatic switching among the wires. After the signaling type of an insertion of any connector is detected, the connector control unit performs a route switching to define a combination of the wires according to a control signal.

16 Claims, 5 Drawing Sheets

CONNECTING APPARATUS WITH A COMBO PORT

REFERENCE TO RELATED APPLICATIONS

This Patent Application is based on Provisional Patent Application Ser. No. 61/380,805, filed 8 Sep. 2010, currently pending.

BACKGROUND OF THE INVENTION

1. Field of the Invention

The instant disclosure is related to a connecting apparatus with a combo port, more particularly to a network connecting apparatus which employs a pin-sharing mechanism to perform two or more network connection formats at the same time.

2. Description of Related Art

With regard to the network arrangement, at least two types of connecting ports are employed. RJ-45 serial port and RJ-11 telecommunication terminal are the general types of connectors. 8-pin RJ-45 connector is the preferred type used for bridging the network devices including Switch, Router, Repeater, Hub, and Bridge. The male connector is shown in FIG. 1(A), and the corresponding female connector is such as shown in FIG. 1(B). The pins of RJ-45 connector are indicated by numbers 1, 2, 3, 4, 5, 6, 7 and 8. Table 1 shows an example illustrating the definitions of pins of the RJ-45 stranded wire with 10M/100M transmission rate connector.

TABLE 1

| pin | Functionality    | Pin Indication |
|-----|------------------|----------------|
| 1   | Data transmission | Tx+           |
| 2   | Data transmission | Tx−           |
| 3   | Data reception    | Rx+           |
| 4   | n/a              | n/a            |
| 5   | n/a              | n/a            |
| 6   | Data reception    | Rx−           |
| 7   | n/a              | n/a            |
| 8   | n/a              | n/a            |

The table 1 shows some unused pins 4, 5, 7, 8 at 10/100 BASE, and these pins may be used for 1000M data rate. The stranded wire with data transmission rate at 1000M may employ all pins. The pin definitions are exemplarily illustrated in Table 2.

TABLE 2

| pin | Functionality                            | Pin Indication |
|-----|------------------------------------------|----------------|
| 1   | Duplex data transmission and reception (A+) | BI_DA+      |
| 2   | Duplex data transmission and reception (A−) | BI_DA−      |
| 3   | Duplex data transmission and reception (B+) | BI_DB+      |
| 4   | Duplex data transmission and reception (C+) | BI_DC+      |
| 5   | Duplex data transmission and reception (C−) | BI_DC−      |
| 6   | Duplex data transmission and reception (B−) | BI_DB−      |
| 7   | Duplex data transmission and reception (D+) | BI_DD+      |
| 8   | Duplex data transmission and reception (D−) | BI_DD−      |

Reference is made to the RJ-11 connector shown in FIG. 2. In general application, RJ-11 includes 6 pins with definitions. Table 3 shows an exemplary example showing the definitions. The RJ-11 telecommunication port is generally used for the telephone line, and also for application of Digital Subscriber Line (DSL). xDSL indicates that the telephone line is made of copper stranded wires. The telephone line is thereby implemented as a network line through the data transformation by a DSL modem. A multifunctional personal computer may be equipped with both RJ-45 and RJ-11 connectors.

TABLE 3

| pin | Functionality           | Pin Indication |
|-----|-------------------------|----------------|
| 1   | Data transmission (−)   | E_TX−          |
| 2   | Data reception (+)      | E_RX+          |
| 3   | Vocal telephone (ground)| Tip            |
| 4   | Vocal telephone (electric) | Ring        |
| 5   | Data reception (−)      | E_RX−          |
| 6   | Data transmission (+)   | E_TX+          |

Thus the detailed description directed to the invention is disclosed to provide a solution therefor.

SUMMARY OF THE INVENTION

Based on the understanding of the conventional eight pins of the standard RJ-45 serial connector and the six pins RJ-11 telecommunication connector, they have a certain similarity. Especially, the plugs and inside tenons of both conventional connectors are interchangeable. The instant disclosure discloses a combo-type connecting port integrating at least two standards of connection. The combo-type connecting port includes a connecting terminal compatible with an RJ-45 serial connector and an RJ-11 telecommunication connector.

According to one of the embodiments in the invention, the connecting apparatus with a combo port mainly has a connector module, which is compatible with two or more combo-type connections in compliance with some standards. The port includes a plurality of electrical contacts and the corresponding metal wires. A detecting unit connected with the connector module is also included. The detecting unit is driven to detect the electrical signal as plugging into the connector module. The connecting apparatus with a combo port further includes a connector control unit connected with the connector module for generating a control signal according to the detection result made by the data processing unit through the detecting unit. The control signal is used to control the line combinations of the connector module.

The connecting apparatus, in one embodiment, is exemplarily an RJ-45 connector having eight pins in compliance with a standard of connection. This combo-type connecting port also has the pins adapted to the RJ-11 connector. Thus the apparatus includes some unshared lines and some shared lines.

A line switching mechanism is particularly introduced to implement the invention that provides shared pins for both RJ-45 connector and RJ-11 connector. The mechanism allows the connecting apparatus in the invention to support the standards of 10BASE-T, 100BASE-TX, and 1000BASE-T, and also the RJ-11 connector. According to one of the embodiments, the switching mechanism is accomplished by a relay circuit used for receiving a switching signal.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Network registered Jack includes some types, such as RJ-45 and RJ-11. The RJ-45 connector is a terminal of cable for data transmission over a network. The types of connections are generally made for the household network devices, such as router and hub, or prepared between the network device and a computer system. Further, the RJ-11 connector is usually adapted to the telephone line, including the connection between the telephone line and the indoor Digital subscriber line modem, such as the ADSL modem. The RJ-11 connector is also used for connecting the personal computer and the modem for dialing up to the network.

One of the objectives in the instant disclosure is to integrate the mentioned two standards of connection. A connecting apparatus with a combo port is accordingly disclosed. In particular, a combo-type connecting port is provided for integrating the types of connections, especially to a female connector therefor. The combo-type connecting port is electrically connected with a detecting unit and a control circuit. The detecting unit is used to detect a connection signal therebetween. The connection signal is made for confirming a connection mode, and accordingly switching one of the connection modules for the various types of connections.

Figure 1A:
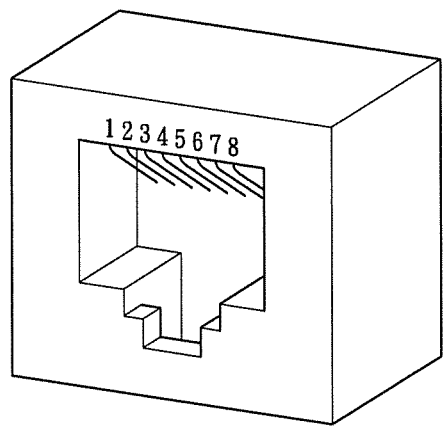
FIG. 1 (A)(B) schematically show the RJ-45 connectors in the conventional technology.
Figure 1B:
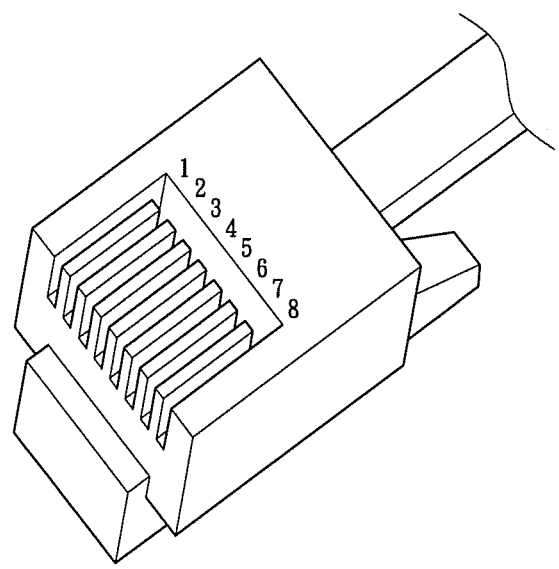
Figure 2:
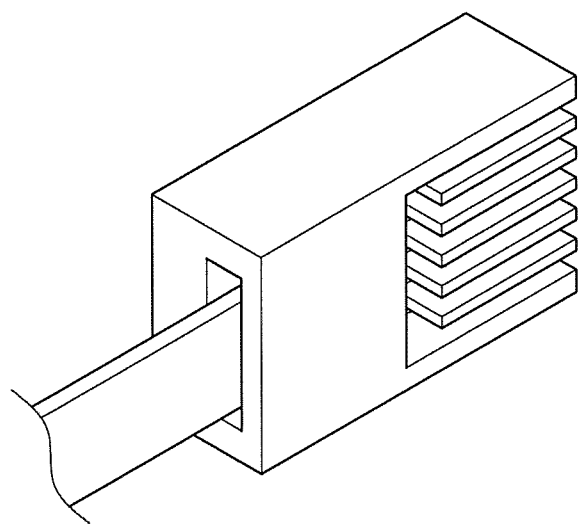
FIG. 2 schematically shows an RJ-11 telecommunication connector in the conventional technology.
Figure 3:
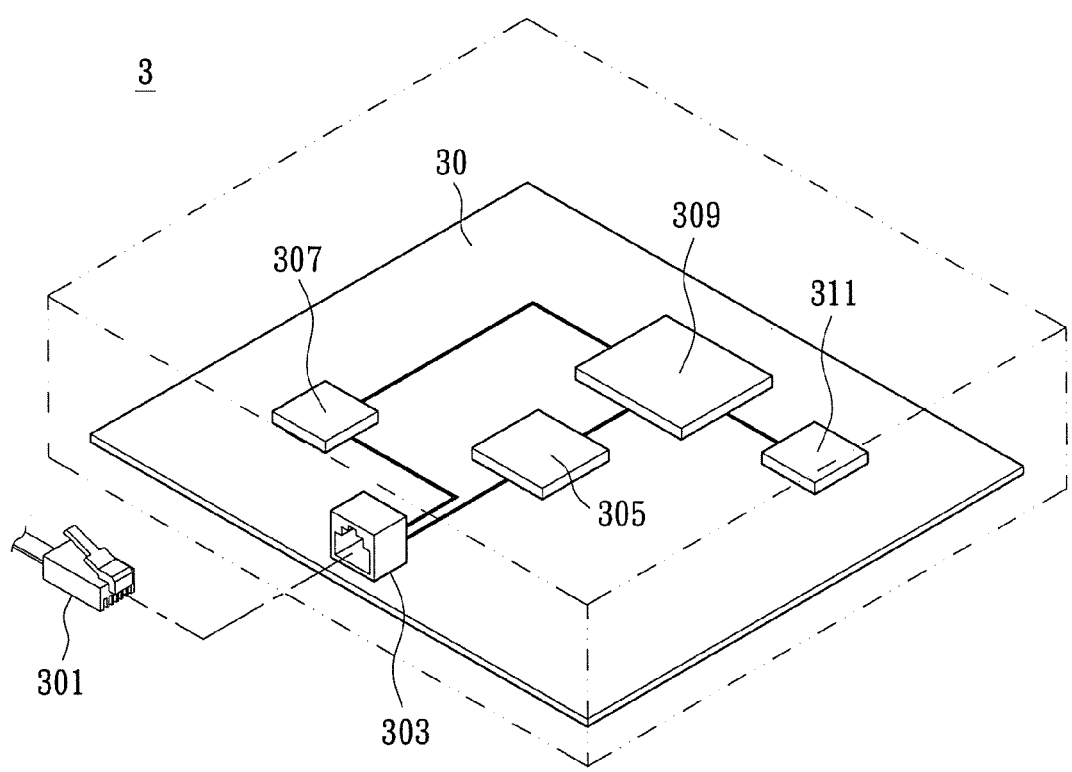
FIG. 3 is a schematic diagram showing a connecting apparatus with a combo port of the computer system in one embodiment of the present invention.

Reference is made to FIG. 3, which describes a schematic diagram of a connecting apparatus with a combo port in a computer system in one embodiment. This connecting apparatus with a combo port is particularly implemented in a main board 30 of a computer system 3. One of the primary components is a connector module 303 on the main board 30. This connector module 303 is a combo-type connecting port in compliance with two or more standards of connection. The port is equipped with a plurality of electrical contacts and the connected metal wires. The structure of connector module 303 has a female connector housing, metal-made electrical contacts, and the lines (not shown) connected to the main board 30. In one embodiment of the disclosure, the combo-type connecting port integrates the female connectors for the mentioned RJ-45 and RJ-11 connections. The related connector module 303 mostly has eight pins.

The connecting apparatus with a combo port is exemplarily a combo-type connecting port supporting various standards of connection. An automatic detecting means is introduced to detecting the connection standard as any connection plugged into the combo-type connecting port automatically, especially through a detecting circuit. Next, according to the detection result, a switching means is introduced to conducting a line switching. The related detection regards the electrical signals measured from the state of the plugging physical layer. In other words, a specific communication protocol for the contacts to be detected is acquired.

In one of the embodiments of the disclosure, the mentioned automatic detecting and switching means may be respectively implemented as a connector control unit 305 and a detecting unit 307 as shown in the diagram of the connecting apparatus with a combo port. For the purpose of supporting various standards of connection, the connector module 303 is electrically connected with the connector control unit 305 and the detecting unit 307. The detecting unit 307 is to automatically detect the electrical signals of the connecting terminal 301 plugged into the port of connector module 303. Through the connecting relationship with regard to the electrical signals of the electrical contacts, it is able to acquire the property of connecting terminal 301 and also determine the standard of the connection source.

According to the embodiment, the detecting unit 307 is electrically with a data processing unit 309. The data processing unit 309 receives the signal property from the detecting unit 307, and the process the signaling among the connections and data processing. The data processing unit 309 also handles the network packets forwarding and transmitting. In response to the detection result, a control signal is generated. This control signal will be transmitted to the connector control unit 305 for controlling the line combination of the connector module 303 so as to comply a specific standard of connection. The connector control unit 305 is electrically connected with the data processing unit 309, and functioned to receive the control signal from the data processing unit 309. According to the control signal, a specific line combination is allowed to implement the pin definition for the RJ-45 serial connector or the 6-pin RJ-11 connector.

The connecting apparatus with a combo port includes a memory unit 311, according to one of the embodiments, electrically connected to the data processing unit 309 for storing user's configurations to the apparatus. Or, the memory unit 311 is also for storing the configurations which are ever detected. Thereby, the connecting apparatus with a combo port may be configured to control the line combination of the connector module 303 by referring to the configurations stored in the memory unit 311 in the future.

According to one further embodiment in accordance with the present invention, the connector module 303 shown in FIG. 3 may be a standalone device, but not installed on the main board. For instance, the shown connector module (303) may be the device connected to a handheld device or other systems through an adapter such as a USB or other types of adapters.

First Embodiment

Table 4 shows a first embodiment of the specification regarding 8-pin RJ-45 connector.

In the present embodiment, the connector may have a plurality of electrical contacts, preferably eight pins and numbered 1, 2, 3, 4, 5, 6, 7 and 8. This format is especially applicable to the RJ-45 standard. The numbered pins 2, 3, 4, 5, 6 and 7 correspond to the format for RJ-11 connector, whose pins numbered 1, 2, 3, 4, 5 and 6. In other words, there are six pins of the eight pins of RJ-45 connector being shared with RJ-11 connector.

In practice, the connecting apparatus with a combo port may have some unshared lines, for example, the 10/100BASE standard lines may not necessary to be shared with the lines of RJ-11 connector. On the contrary, two of 1000BASE lines may be shared with the RJ-11 connector. The related description is referred to FIGS. 6 and 7.

Regarding functionalities to the connecting apparatus, four pins numbered 1, 2, 3 and 6 of the eight pins of RJ-45 connector are adapted to the connection for Ethernet network. In one embodiment, the pins of the mentioned standards in compliance with 10BASE-T and 100BASE-TX may be indicated as E_TX+, E_TX−, E_RX+, and E_RX−. The pins 3 and 4 respectively indicate Tip and Ring, which are applicable to xDSL connection. The general telephone line is a 2-pin stranded wire.

TABLE 4

| RJ-45 pins | RJ-11 pins | Functionality | Indication |
|---|---|---|---|
| 1 | | Ethernet network | E_TX+ |
| 2 | 1 | Ethernet network | E_TX− |
| 3 | 2 | Ethernet network | E_RX+ |
| 4 | 3 | xDSL | Tip |
| 5 | 4 | xDSL | Ring |
| 6 | 5 | Ethernet network | E_RX− |
| 7 | 6 | | |
| 8 | | | |

Figure 4:
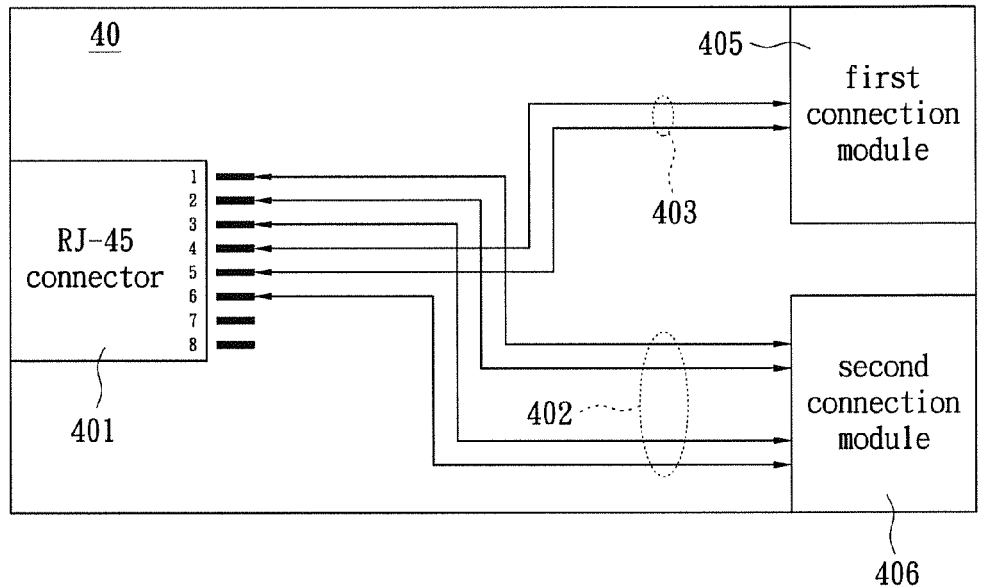
FIG. 4 shows a schematic diagram of a connecting apparatus with a combo port in one embodiment of the present invention.

Further reference is made to FIG. 4, where a connecting apparatus with a combo port 40 embodying an RJ-45 connector 401 is shown. Eight pins and corresponding eight metal wires are provided. The pins and the wires, in accordance with a specific standard of connection, are shared with both first connection module 405 and second connection module 406.

The metal wires may be divided into several line combinations. The practical implementation for the 10BASE-T or 100BASE-TX standard adopts pins 1, 2, 3 and 6 of the eight pins. As shown in the diagram, the line combination 402 having pins 1, 2, 3 and 6 is linked to the second connection module 406, which may be the circuit module of Ethernet network. The line combination 403 having the pins 4 and 5 is linked to the first connection module 405, such as the circuit module of Digital subscriber line.

Reference is made to FIG. 4 showing a circuit arrangement. The connecting apparatus 40 is configured to connect to the first connection module 405 and the second connection module 406. This apparatus 40 integrates at least two terminals with two standards of connection. By referring to FIG. 3, the detecting unit is used to detect the electrical signal as in connection to one of the modules (405, 406). Then a suitable line combination (402 or 403) may be selected. By means of automatically detecting the signal for each pin, a certain line combination can be exactly switched rather than the conventional configuration which needs to be reset firstly before the connection.

Second Embodiment

Table 5 shows another embodiment related to the connecting apparatus in accordance with the present invention. The pins of RJ-45 connector are indicated as pins 1, 2, 3, 4, 5, 6, 7 and 8. The pins 2, 3, 4, 5, 6 and 7 are corresponding to the pins 1, 2, 3, 4, 5 and 6 of RJ-11 connector. The pins 2, 3, 6 and 7 of RJ-45 connector are adapted to connection of Ethernet network, and indicated as E_TX−, E_RX+, E_RX− and E_TX+ correspondingly. The pins 3 and 4 of RJ-11 connector are applicable to the network connection of Digital subscriber line, and they are Tip and Ring.

TABLE 5

| RJ-45 pin | RJ-11 pin | Functionality | Indication |
|---|---|---|---|
| 1 | | | |
| 2 | 1 | Ethernet network | E_TX− |
| 3 | 2 | Ethernet network | E_RX+ |
| 4 | 3 | xDSL | Tip |
| 5 | 4 | xDSL | Ring |
| 6 | 5 | Ethernet network | E_RX− |
| 7 | 6 | Ethernet network | E_TX+ |
| 8 | | | |

Figure 5:
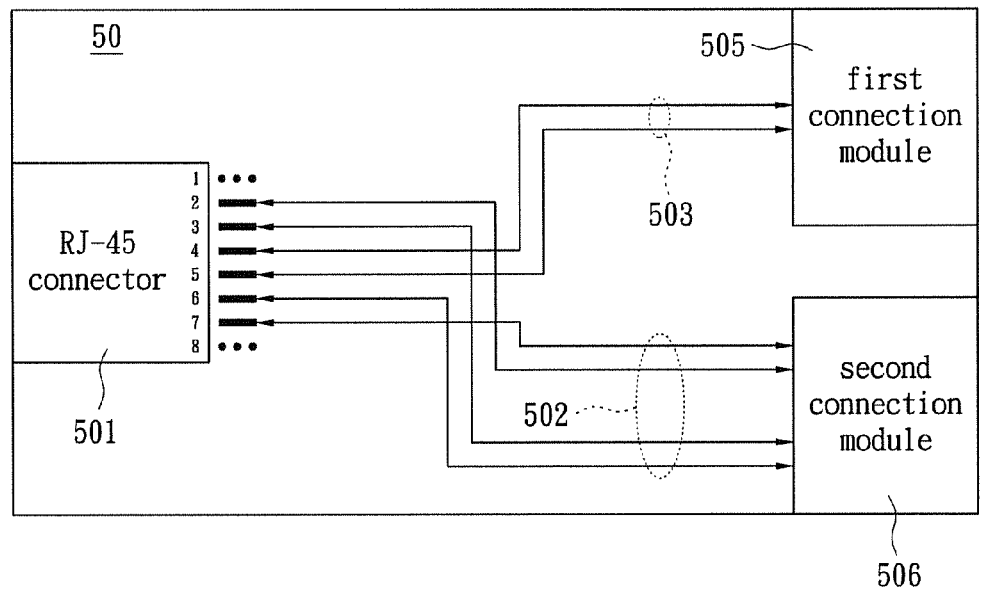
FIG. 5 shows a schematic diagram of a connecting apparatus with a combo port in one further embodiment of the present invention.

The applications with respect to the pin definitions in Table 5 may be referred to the embodiment described in FIG. 5.

The shown 8-pin RJ-45 connector 501 embodies the connecting apparatus with a combo port 50 according to the invention. The pins 1 and 8 are disabled, and the pins 2, 3, 6 and 7 assemble a line combination 502, especially applicable to the RJ-45 connector. This line combination 502 is linked with the second connection module 506 exemplarily for the wiring of Ethernet network. The pins 4 and 5 form a line combination 503, which is linked with the first connection module 505, applicable to wiring the RJ-11 connector. RJ-11 connector may be used for the circuit module of Digital subscriber line.

The detecting circuit is used to detect the electrical signal as the connecting apparatus 50 is plugged with the RJ-45 connector 501. The associated connection format can therefore be determined. A control circuit is used to switch the connection to the first connection module 505 or to the second connection module 506 in response to the detected electrical signal.

Third Embodiment

The next Table 6 shows one further embodiment of the connecting apparatus in accordance with the present invention. The shown pins are exemplarily served for 10BASE-T, 100BASE-TX, 1000BASE-T (the RJ-45), and RJ-11 standards of connection at one time. The pins for RJ-45 connector are indicated by 1, 2, 3, 4, 5, 6, 7 and 8. The pins 2, 3, 4, 5, 6 and 7 correspond to the pins 1, 2, 3, 4, 5 and 6 for RJ-11 connector. The connecting apparatus still supports the transmission rate with 1000M (1000BASE-T). When the pins 1, 2, 3, 6, 7 and 8 of RJ-45 connector are adapted to connection for Ethernet network, the pins may be identified by E_AP, E_AN, E_BP, E_CP, E_CN, E_BN, E_DP, and E_DN. The pins 3 and 4 of RJ-11 connector are applicable to the connection of Digital subscriber line. Meanwhile, the two pins can be identified by Tip and Ring respectively. These two shared pins are also identified by Tip/E_CP and Ring/E_CN.

TABLE 6

| RJ-45 pin | RJ-11 pin | Functionality | Indication |
|---|---|---|---|
| 1 | | Ethernet network | E_AP |
| 2 | 1 | Ethernet network | E_AN |
| 3 | 2 | Ethernet network | E_BP |
| 4 | 3 | xDSL/Ethernet network | Tip/E_CP |

TABLE 6-continued

| RJ-45 pin | RJ-11 pin | Functionality | Indication |
|---|---|---|---|
| 5 | 4 | xDSL/Ethernet network | Ring/E_CN |
| 6 | 5 | Ethernet network | E_BN |
| 7 | 6 | Ethernet network | E_DP |
| 8 |   | Ethernet network | E_DN |

Figure 6:
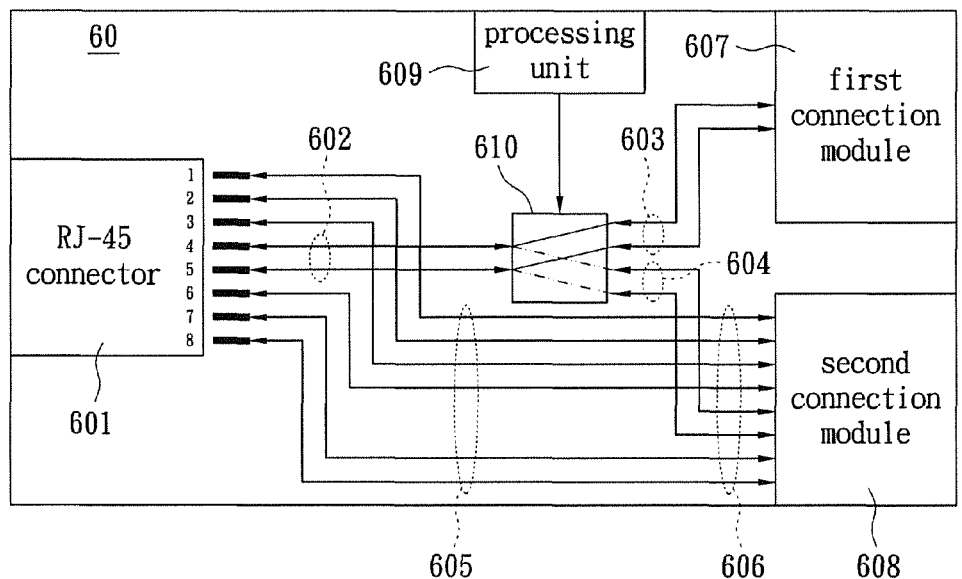
FIG. 6 shows a schematic diagram of a connecting apparatus with a combo port in third embodiment of the present invention.

FIG. 6 shows the embodiment associated with the Table 6.

RJ-45 connector 601 embodies the connector module of the shown connecting apparatus with a combo port. The pins 1, 2, 3, 4, 5, 6, 7 and 8 include at least two definitions of line combinations. In which, the pins 1, 2, 3, 6, 7 and 8 form a line combination 60, and the pins 4 and 5 assemble a line combination 602. The function of the line combination 602 may be switched by a switching means. Therefore, the connecting apparatus can be adapted to both xDSL and Ethernet network connections.

In the exemplary example, the switching means may be implemented by a relay circuit 610 connected to the processing unit 609. The relay circuit 610 switches the line combinations in response to a switching signal generated from the processing unit 609. The switching means is served in the midst of the line combination 603 or of the line combination 604. The line combination 603 is exemplarily connected to the first connection module 607, and the line combination 604 is to the second connection module 608. In one embodiment, the line combination 605 for the RJ-45 connector 601 is extended to assemble the line combination 606 connected to the second connection module 608.

According to the embodiment described in FIG. 6, the mentioned switching means, in response to the switching signal, performs the switching between the first connection module 607 for xDSL line and the second connection module 608 for Ethernet network. Therefore, the connecting apparatus with a combo port is allowed to supports at least two standards of connection. In the preferred embodiment, the connecting apparatus can be served for 10BASE-T, 100BASE-TX, 1000BASE-T, and RJ-11 standards. In particular, the 1000BASE-T connection uses the full eight pins of RJ-45 connector. When the eight pins need to be shared with the RJ-11 connector, the switching means may generate the switching signal through the relay circuit 610, or other equivalent switching mechanisms.

The described processing unit 609 may be implemented as the connector control unit 305 shown in FIG. 3, or other processing chip integrated with controlling, detection, and data processing.

Fourth Embodiment

Figure 7:
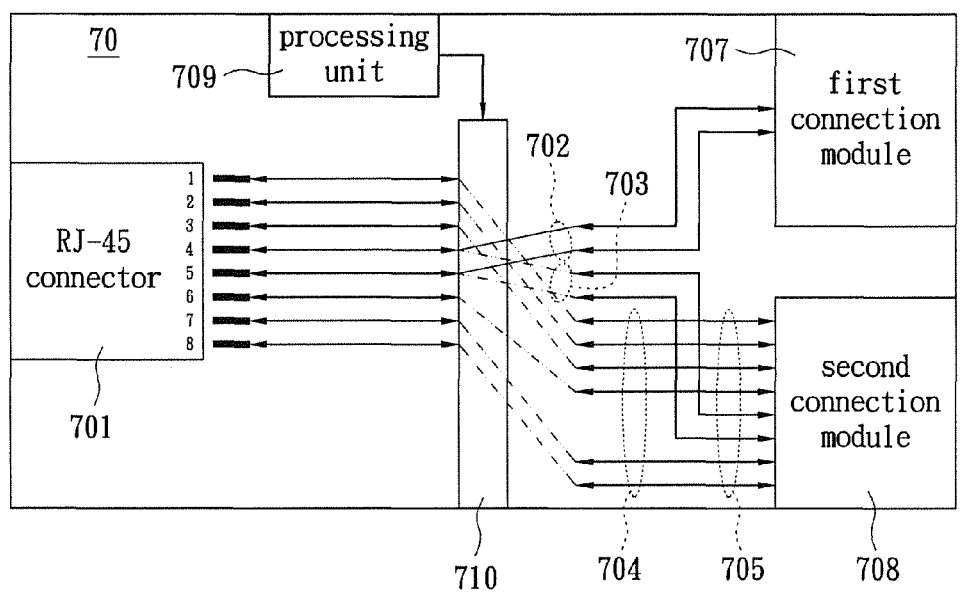
FIG. 7 shows a schematic diagram of a connecting apparatus with a combo port in fourth embodiment of the present invention.

FIG. 7 shows another embodiment for standards including 10BASE-T, 100BASE-TX, 1000BASE-T, and RJ-11 connections. An RJ-45 connector 701 embodies the connector module. Pins 1, 2, 3, 4, 5, 6, 7 of 8 of the RJ-45 connector 701 are connected with a switching module 710. The switching module 710 implements a switching action among the standards of connection. In an exemplary example, the switching module 710 performs the switching according to the switching signal generated from the processing unit 709. The switching module 710 then uses the different line combinations (702, 703, 704, and 705) to link with a first connection module 707 and a second connection module 708.

The connector module supports 10BASE-T, 100BASE-TX, 1000BASE-T, and RJ-11 connections. The switching module 710 shall provide various switching modes for supporting the various standards. When the detecting circuit checks any connection by 10BASE-T or 100BASE-TX, four pins of the connecting apparatus are switched to the cline combination connected to the second connection module 708, exemplarily for Ethernet network. Since the detecting circuit detects the connection of 1000BASE-T is connected, eight pins thereof can be assembled for linking to the same line combination of second connection module 708. Further, if the RJ-11 connection is detected, only two pins of the port need to be switched to conduct the connection to the first connection module 707. The above-mentioned line combinations shall be adequately configured to fit in with the specific connection, including the user's configuration stored in the memory unit (referred to FIG. 3) as required.

Furthermore, the 1000BASE-T connection uses eight pins of the port. Two pins, such as the shown pins 4 and 5, thereof are shared with RJ-11 connector. The pins 4 and 5 may be switched to serve the first connection module 707, for example the line combination 702, by the switching module 710. Alternatively, the second connection module 708, namely the line combination 703, may be served by the pins 4 and 5 in the example. The line combination 703 may be assembled with the line combination 704 so as to form a line combination 705, in which the eight pins are jointly serving the second connection module 708.

The above-mentioned processing unit 709 can also be achieved by the connector control unit 305 shown in FIG. 3, or the other processing chip for performing controlling, detection, and data processing.

In an exemplary embodiment of the connecting apparatus with a combo port in accordance with the present invention, part or the entire associated connector module, detecting unit, connector control unit and the data processing unit may be integrated into a chip in a computer system. For example, a chip integrated with a detecting circuit and a control circuit may be provided. The mentioned functions may also be implemented in an IC to integrate the Ethernet network circuits and the Digital subscriber line circuits. The IC has capability of automatically detecting the connected signal, and well providing a suitable line switching.

To sum up the above description, connecting apparatus with a combo port is to integrate the various standards of connection by means of pins sharing. Further, the mechanism of connection detection achieves the automatic switching means to perform the automatic switching.

It is intended that the specification and depicted embodiment be considered exemplary only, with a true scope and spirit of the invention being indicated by the broad meaning of the following claims.

What is claimed is:

1. A connecting apparatus with a combo port, comprising:
   a connector module being a combo-type connecting port in compliance with two or more standards of connection; wherein the connector module includes a plurality of electrical contacts connected with a plurality of metal wires, and the metal wires are divided into several line combinations respectively linked to a circuit module for Digital subscriber line, and the other circuit module for Ethernet network;
   a detecting unit, electrically connected to the connector module, for detecting an electrical signal as plugging into the connector module;
   a connector control unit, electrically connected with the connector module, for controlling line combination of the connector module according to a control signal;
   a data processing unit, electrically connected with the detecting unit and the connector control unit, for generating the control signal according to a detection result made by the detecting unit; and
a memory unit, electrically connected to the processing unit data processing unit, used to store connection configuration while the connecting apparatus is initialized, wherein the stored configuration which is ever detected by the detecting unit is for speeding up the future setting;
wherein, the connector control unit performs an automatic switching process to switch one of the line combinations according to the control signal,
wherein the automatic switching process is applied to:
an RJ-11 connector, in compliance with standard of the Digital subscriber line, connected to circuit module of the Digital subscriber line;
an RJ-45 connector, in compliance with 10BASE-T or 100BASE-TX standard, connected to circuit module of the Ethernet network; and
the RJ-45 connector, in compliance with 1000BASE-T standard, connected to the circuit module of the Ethernet network.

2. The connecting apparatus of claim 1, wherein the connector module is a connector with 8 pins.

3. The connecting apparatus of claim 2, wherein the eight pins are jointly connected to electrical contacts of the RJ-45 connector, and six pins thereof are jointly connected to electrical contacts of the RJ-11 connector.

4. The connecting apparatus of claim 3, wherein four pins of the electrical contacts of the RJ-45 connector incorporate the 10BASE-T or 100BASE-TX standard of connection, and connect to the circuit module for Ethernet network.

5. The connecting apparatus of claim 3, wherein two of the eight pins are the pins for the RJ-11 connector are incorporated into DSL standard of connection, and connect to the circuit module of the Digital subscriber line.

6. The connecting apparatus of claim 1, wherein the connecting apparatus with a combo port is disposed onto a circuit board of computer system.

7. The connecting apparatus of claim 1, wherein the connecting apparatus with a combo port is implemented as an independent connector.

8. A connecting apparatus with a combo port, comprising:
a connector module being a combo-type connecting port in compliance with two or more standards of connection; wherein the connector module includes a plurality of electrical contacts, and connects to a plurality of metal wires, and the metal wires are divided into several line combinations respectively linked to a circuit module for Digital subscriber line, and the other circuit module for Ethernet network;
a detecting means for detecting an electrical signal as plugging in the connector module;
a memory unit used to store connection configuration while the connecting apparatus is initialized, wherein the stored configuration which is ever detected by the detecting means is for speeding up the future setting; and
a switching means for generating a switching signal to automatically switch one of the line combinations of the connector module according to a detection result; wherein the automatic switching is applied to:
an RJ-11 connector, in compliance with standard of the Digital subscriber line, connected to circuit module of the Digital subscriber line;
an RJ-45 connector, in compliance with 10BASE-T or 100BASE-TX standard, connected to circuit module of the Ethernet network; and
the RJ-45 connector, in compliance with 1000BASE-T standard, connected to the circuit module of the Ethernet network.

9. The connecting apparatus of claim 8, wherein the switching signal is generated by a processing unit in response to the detection result.

10. The connecting apparatus of claim 8, wherein the switching means is implemented by a relay circuit, and the relay circuit performs connection switching of the connector module as receiving the switching signal.

11. The connecting apparatus of claim 10, wherein the relay circuit connects to one of the line combinations with the circuit module of the Ethernet network, and the circuit module of Digital subscriber line, and the line combination includes the unshared lines and the shared lines.

12. A connecting apparatus with a combo port, comprising:
a combo-type connecting port, compatible with two or more types of connections, wherein the combo-type connecting port includes a plurality of electrical contacts, and connects to a plurality of metal wires; the metal wires are divided into a plurality of line combinations respectively connected to a first connection module being a circuit module for Digital subscriber line, and a second connection module being the other circuit module for an Ethernet network;
a memory unit used to store connection configuration while the connecting apparatus is initialized, wherein the stored configuration which is ever detected is for speeding up the future setting; and
a switching means, performing automatic connection switching of the combo-type connecting port according to a switching signal generated by a data processing unit, including switching line combinations divided by the plurality of metal wires; wherein the automatic connection switching is applied to:
an RJ-11 connector, in compliance with standard of the Digital subscriber line, connected to circuit module of the Digital subscriber line;
an RJ-45 connector, in compliance with 10BASE-T or 100BASE-TX standard, connected to circuit module of the Ethernet network; and
the RJ-45 connector, in compliance with 1000BASE-T standard, connected to the circuit module of the Ethernet network.

13. The connecting apparatus of claim 12, wherein the combo-type connecting port includes eight electrical contacts compatible with the RJ-45 connector and the RJ-11 connector.

14. The connecting apparatus of claim 13, wherein eight pins are jointly connected to electrical contacts of the RJ-45 connector, and six pins thereof are jointly connected to the electrical contacts of the RJ-11 connector.

15. The connecting apparatus of claim 14, wherein four pins of the electrical contacts of the RJ-45 connector are incorporated into 10BASE-T or 100BASE-TX standard of connection, and connected to the circuit module of the Ethernet network.

16. The connecting apparatus of claim 14, wherein eight pins of the electrical contacts of the RJ-45 connector is incorporated into 1000BASE-T standard of connection, and connected to the circuit module of the Ethernet network.

* * * * *